United States Patent
Van Camp

(10) Patent No.: US 10,274,808 B1
(45) Date of Patent: Apr. 30, 2019

(54) RECONFIGURABLE QUASI-PHASE MATCHING FOR FIELD-PROGRAMMABLE NONLINEAR PHOTONICS

(71) Applicant: BAE Systems Information and Electronic Systems Integration Inc., Nashua, NH (US)

(72) Inventor: Mackenzie A. Van Camp, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/920,655

(22) Filed: Mar. 14, 2018

(51) Int. Cl.
 *G02F 1/355* (2006.01)
 *G02F 1/39* (2006.01)

(52) U.S. Cl.
 CPC ............ *G02F 1/3558* (2013.01); *G02F 1/395* (2013.01); *G02F 2201/12* (2013.01); *G02F 2201/30* (2013.01)

(58) Field of Classification Search
 CPC .... G02F 1/3558; G02F 1/395; G02F 2201/30; G02F 2201/12
 See application file for complete search history.

(56) References Cited

U.S. PATENT DOCUMENTS

| | | | | |
|---|---|---|---|---|
| 6,608,360 B2* | 8/2003 | Starikov | ............... | H01L 31/108 257/449 |
| 6,956,221 B2* | 10/2005 | Gruhlke | ................. | B82Y 20/00 250/458.1 |
| 7,453,625 B2* | 11/2008 | Yamaguchi | ........... | G02F 1/3558 359/321 |
| 8,311,372 B2* | 11/2012 | Anderson | ............... | G02F 1/295 349/21 |

OTHER PUBLICATIONS

S. Mailis, C. Riziotis, I. T. Wellington, P. G. R. Smith, C. B. E Gawith, and R. W. Eason, Direct Ultraviolet Writing of Channel Waveguides in Congruent Lithium Niobate Single Crystals, Optics Letters, vol. 28, No. 16, pp. 1433-1435, dated Aug. 15, 2003, 2003 Optical Society of America.

(Continued)

*Primary Examiner* — Ryan A Lepisto
(74) *Attorney, Agent, or Firm* — Maine Cernota & Rardin; Scott J. Asmus

(57) ABSTRACT

A device, system, and method for in situ reconfigurable quasi-phase matching field-programmable nonlinear photonics that is reliably reconfigurable and maintains nonlinear conversion efficiency is presented. Devices include a ferroelectric waveguide susceptible to light-assisted poling; (UV-transparent) first electrode(s); one or more UV illumination sources; at least a second electrode; and a substrate. Reconfiguring the hybrid electronic/photonic field programmable array device includes selecting a device type; selecting parameters for the device; determining per-electrode voltages for the device; determining timing values for reconfiguring the device; initiating illumination of the device; applying per-electrode voltages of the device; terminating per-electrode voltages according to the timing values; and terminating illumination according to the timing values.

17 Claims, 8 Drawing Sheets

DEVICE FIRST EMBODIMENT (NOT TO SCALE)

(56) References Cited

OTHER PUBLICATIONS

C. L. Sones, M. C. Wengler, C. E. Valdivia, S. Mailis, R. W. Eason, and K. Buse, Light-induced Order-of-Magnitude Decrease in the Electric Field for Domain Nucleation in MgO-doped Lithium Niobate Crystals, Applied Physics Letters, 86, 212901, Published online May 16, 2005, 2005 American Institute of Physics, Downloaded Nov. 10, 2009 to 152.78.208.72. Redistribution subject to AIP license or copyright; see http://apl.aip.org/apl/copyright.isp.
C. E. Valdivia, C. L. Sones, S. Mailis, J. D. Mills, and R. W. Eason, Ultrashort-pulse Optically-assisted Doman Engineering in Lithium Niobate, Ferroelectrics vol. 340, Issue 1, pp. 75-82, Accepted May 24, 2006.
Peng Wang, Jia Qi, Zhengming Liu, Yang Liao, Wei Chu, and Ya Cheng, Fabrication of Polarization-Independent Waveguides Deeply Buried in Lithium Niobate Crystal Using Aberration-Corrected Femtosecond Laser Direct Writing, Nature Scientific Reports, Published: Jan. 23, 2017, pp. 1-6, DOI: 10.1038/srep41211.
Jia Qi, Peng Wang, Yang Liao, Wei Chu, Zhengming Liu, Zhaohui Wang, Lingling Qiao, Yacheng, Fabrication of Polarization-Independent Singlemode Waveguides in Lithium Niobate Crystal With Femtosecond Laser Pulses, Optical Materials Express, May 2016, 6 pages.

* cited by examiner

HYBRID ELECTRONIC/PHOTONIC FIELD PROGRAMMABLE ARRAY

DEVICE FIRST EMBODIMENT (NOT TO SCALE)

DEVICE SECOND EMBODIMENT (NOT TO SCALE)

DEVICE FOURTH EMBODIMENT (NOT TO SCALE)

DEVICE FABRICATION METHOD

DEVICE USE METHOD

DEVICE (RE)CONFIGURING METHOD

US 10,274,808 B1

RECONFIGURABLE QUASI-PHASE MATCHING FOR FIELD-PROGRAMMABLE NONLINEAR PHOTONICS

FIELD OF THE DISCLOSURE

The application relates to a device and method for reconfigurable quasi-phase-matched field-programmable nonlinear photonic devices.

BACKGROUND

Photonic devices are used in many applications including medicine, manufacturing, telecommunications, data storage, computing, and imaging. Nonlinear photonic devices have the potential to provide processing that is primarily performed electronically.

Most modern nonlinear devices achieve high efficiency through quasi-phase matching (QPM), which enhances nonlinear interactions by periodically alternating the direction of the material's polarization. This polarization engineering is performed during device fabrication, and is permanently frozen in to the device. However, a QPM photonic device can only perform the nonlinear operations that are hard-wired into the device during fabrication, limiting its versatility. The permanent nature of QPM is a limitation for reconfigurable photonic and hybrid photonic/electronic circuits. Each desired nonlinear interaction for every operation that a photonic or hybrid photonic/electronic circuit might run must have (quasi-) phase-matched nonlinear devices in the circuit. Furthermore, attempts to make a device more versatile by broadening the phase matching bandwidth of a single nonlinear element inherently results in lower nonlinear conversion efficiency. Ferroelectric materials like lithium niobate can have their quasi-phase matching grating erased and re-written via electric field poling, but the process requires 1) defining a new QPM pattern on the device, typically through multiple rounds of photolithography, and 2) applying an electric field in excess of 20 kV/mm for typical device configurations. This process is only possible in a laboratory setting, and even then, roughly 1 in 5 attempts at electric field poling destroy the device due to dielectric breakdown.

What is needed is a device and method for in situ reconfigurable quasi-phase matching field-programmable nonlinear photonics that is reliably reconfigurable and maintains nonlinear conversion efficiency.

SUMMARY

An embodiment provides an in situ reconfigurable hybrid quasi-phase matched (QPM) electronic/photonic field programmable device comprising a ferroelectric waveguide susceptible to light-assisted poling; a plurality of ultra-violet (UV)-transparent first electrodes; at least one second electrode; at least one UV illumination source configured to illuminate at least one of the UV-transparent first electrodes and the at least one second electrode; a substrate proximate to the at least one second electrode; wherein the ferroelectric waveguide is between the UV-transparent first electrodes and the at least one second electrode. In embodiments the ferroelectric waveguide comprises a laser-written buried waveguide; and wherein the ferroelectric waveguide comprises magnesium oxide doped stoichiometric lithium niobate (MgO:SLN). In other embodiments, the ferroelectric waveguide comprises a waveguide bottom cladding; a waveguide top cladding; and wherein a distance from the ferroelectric waveguide to the UV-transparent first electrodes and the at least one second electrode prevents one or more of optical scattering, waveguide mode leakage, mode alteration, and additional optical loss. In subsequent embodiments the at least one second electrode comprises one of a plurality of electrodes and a single ground electrode. For additional embodiments the cladding layers comprise $SiO_2$. In another embodiment, the substrate comprises at least one of a handle and other integrated devices. For a following embodiment the thickness of the ferroelectric waveguide is about 50 microns; a spacing of the UV-transparent first electrodes is about 100 microns; and a QPM region is about 10 mm long wherein the QPM region is determined by the spacing of the UV-transparent electrodes. In subsequent embodiments at least one UV illumination source comprises two UV illumination sources, a first proximate the first UV-transparent electrodes and a second UV illumination source proximate the at least one second electrode. In additional embodiments at least one UV illumination source comprises one UV illumination source, either a first proximate the first UV-transparent electrodes, or a second UV illumination source proximate the at least one second electrode.

Another embodiment provides a method for reconfiguring a hybrid quasi-phase matched (QPM) electronic/photonic field programmable array device comprising selecting a (QPM) electronic/photonic field programmable device type; selecting parameters for the device; determining per-electrode voltages for the device; determining timing values for reconfiguring the device; initiating illumination of the device wherein illumination wavelengths range from 305 nm to 514 nm; applying per-electrode voltages of the device; terminating per-electrode voltages according to the timing values; and terminating the illumination according to the timing values. In included embodiments, with UV illumination off, the electrodes provide electro-optic modulation. Yet further embodiments comprise an electric field of about 280V/mm and illumination comprises a continuous-wave 514 nm laser at 200 mW focused to 3 kW/cm2 on an about 100 micron diameter spot. Related embodiments comprise an electric field of about 100V/mm with a pulsed 334 nm or 514 nm laser. For further embodiments a poling field is about 10V when the device is illuminated by a proximate LED.

A yet further embodiment provides an in situ reconfigurable hybrid electronic/photonic field programmable array system comprising a plurality of in situ reconfigurable quasi-phase matched (QPM) hybrid electronic/photonic field programmable devices; each of the plurality of in situ reconfigurable hybrid electronic/photonic field programmable devices comprising a ferroelectric waveguide susceptible to light-assisted poling; UV-transparent first electrodes; at least one UV illumination source; at least one second electrode; and a substrate; wherein the ferroelectric waveguide is between the UV-transparent first electrodes and the at least one second electrode. In ensuing embodiments, the devices of the array comprise at least one of a second harmonic generation device; a sum or difference frequency generation device; a spontaneous parametric down-conversion device; an optical parametric amplification device: an optical parametric oscillator; and an optical rectification device. For yet further embodiments, at least one of the plurality of in situ reconfigurable hybrid electronic/photonic field programmable devices comprises reconfigurable QPM gratings comprises at least one of chirped gratings, interlaced gratings, and sequential gratings. For more embodiments, the ferroelectric comprises lithium tantalate. Continued embodiments include that at least one of the plurality of in situ reconfigurable hybrid QPM electronic/photonic field programmable devices comprises reconfigurable QPM gratings wherein the electrodes are patterned directly on the top and bottom surfaces of a lithium niobate slab. For additional embodiments, at least one of the plurality of in situ reconfigurable hybrid QPM electronic/photonic field programmable devices comprises electrode materials the same as those used in UV LEDs.

Figure 1:
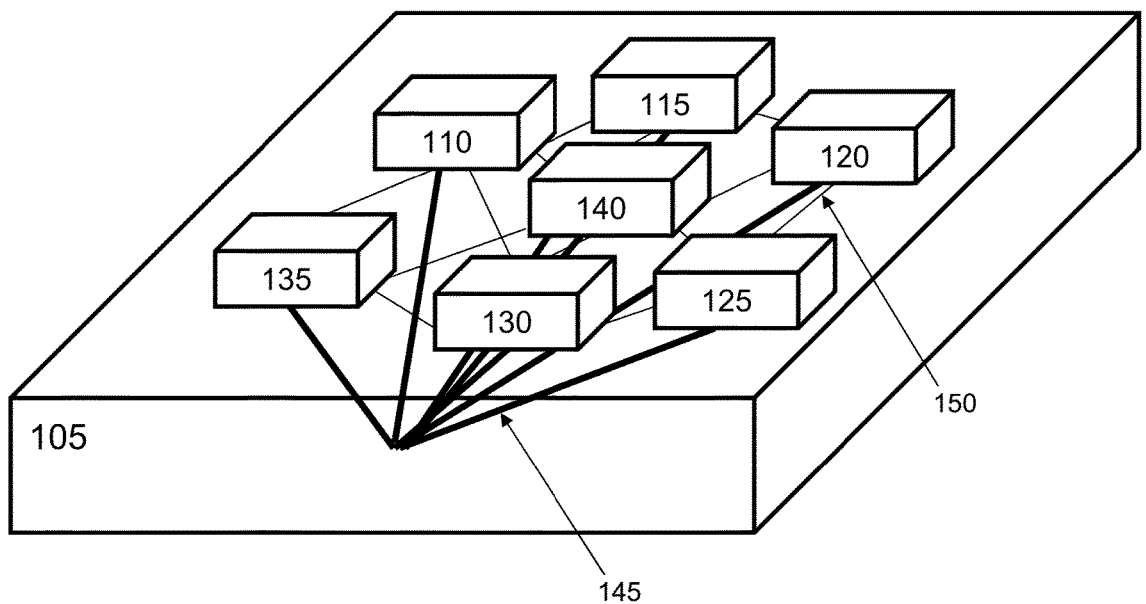
FIG. 1 depicts a hybrid electronic/photonic field programmable array configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Device embodiments can be used for any quasi-phase matched interaction supported by ferroelectric compounds susceptible to light-assisted poling (LAP) including lithium niobate and lithium tantalate. Nonlimiting examples of QPM interaction examples comprise second harmonic generation, sum or difference frequency generation, spontaneous parametric down-conversion, optical parametric amplification, optical parametric oscillators, and optical rectification. With UV illumination off, the electrodes also provide electro-optic modulation. In embodiments, this is valid for any ferroelectric used for electro-optic modulation including LN, LT, KTP, and BBO. Reconfigurable QPM grating embodiments also support testbeds for rapidly testing advanced QPM modalities that are otherwise difficult to fabricate, such as chirped gratings, interlaced gratings, and sequential gratings. These advanced grating designs enable control of the phase-matching bandwidth, and enable multiple nonlinear processes to occur in a single device. For embodiments, ferroelectric compounds not susceptible to light-assisted poling are employed. Nonlimiting examples of ferroelectrics susceptible to light-assisted poling comprise: Lithium niobate (LN), including both congruent LN and stoichiometric LN; undoped LN and magnesium oxide (MgO) doped LN; and Lithium tantalate.

Embodiments leverage light assisted poling and novel device design to reduce the poling voltage and enable repeated reconfiguration of the QPM grating in an integrated lithium niobate device. Light-assisted poling reduces the electric field necessary to invert the polarization of lithium niobate by illuminating the material (typical wavelengths range from 305 nm to 514 nm) while simultaneously applying the poling voltage. Light-assisted poling embodiments comprise magnesium oxide doped stoichiometric lithium niobate (MgO:SLN), with the necessary electric field reduced to 280V/mm under illumination from a 200 mW continuous-wave 514 nm laser or 100V/mm with an intense pulsed 334 nm or 514 nm laser. In embodiments, for a 50 um thick layer of MgO:SLN used in an integrated photonic circuit, the poling field is reduced to the order of 10V when the device is illuminated by, e.g., a nearby LED. As mentioned, embodiments comprise other ferroelectrics susceptible to light assisted poling, including both congruent and stoichiometric lithium niobate (with or without magnesium oxide doping), and lithium tantalate.

For embodiments, a lithium niobate waveguide is buried between suitable substrate and cladding layers (e.g., SiO2), with a uniform linear array of UV-transparent electrodes patterned on the cladding and either a uniform conductor or a matching pattern below the substrate.

In alternative embodiments, a waveguide is directly "written" into the middle of a piece of lithium niobate via direct laser writing, with the electrodes patterned directly on the top and bottom surfaces of the lithium niobate slab. Significantly, embodiments confine the guided light far enough from the electrodes to prevent scattering. In embodiments, electrode materials are the same as those used in UV LEDs. For embodiments, nonlimiting examples comprise indium tin oxide or silver-nanowire-based electrodes. The size and spacing of the electrodes determines the minimum "pixel" size for QPM. For embodiments, a UV LED is either integrated nearby or mounted in the packaging.

To set or reconfigure the QPM grating, the UV LED is turned on while a positive or negative voltage is applied to each electrode, depending on the desired orientation of the polarization. Since the applied field is so low, the risk of dielectric breakdown is very small.

Embodiment devices comprise optical frequency combs and broadband frequency conversion. Each comprises bandwidth engineering and designing/modeling a chirped QPM profile. Embodiment materials comprise a paraelectric and liquid crystals with electrodes. Embodiments comprise paraelectrics or liquid crystals without poling, per se. The electric field would need to remain on throughout operation, instead of applying a voltage pulse. No UV illumination would not be necessary. Embodiments accomplish UV-assisted poling in situ with materials with a low coercive field, such as doped stoichiometric LN. Embodiments comprise sweeping/hopping/modulating the optical wavelength. Embodiments are useful for reconfigurable optical processing, to create an arbitrary programmable nonlinear unit.

FIG. 1 depicts a hybrid electronic/photonic field programmable array embodiment 100. Field programmable array 105 quasi-phase matching (QPM) components 110-135 provide, for example, a programmable second harmonic generation device 110; a programmable sum or difference frequency generation device 115; a programmable spontaneous parametric down-conversion device 120; a programmable optical parametric amplification device 125; a programmable optical parametric oscillator device 130; a programmable optical rectification device 135; and a programmable electro-optic modulation device 140. Configuring and reconfiguring of each component device is accomplished by interfaces 145. Operational interconnections between components 110-135 are depicted by narrow lines 150.

Figure 2:
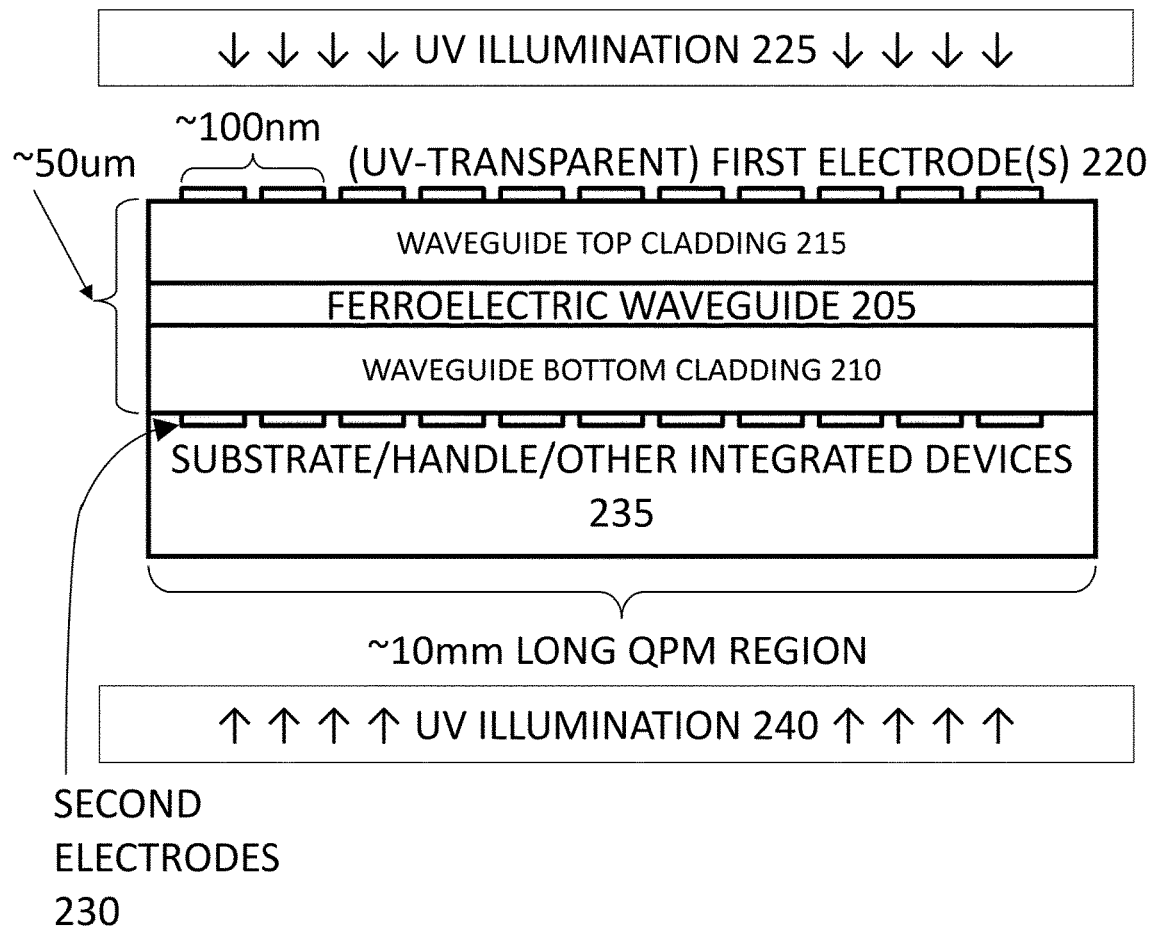
FIG. 2 is a hybrid electronic/photonic field programmable QPM device first embodiment configured in accordance with an embodiment.

FIG. 2 illustrates a QPM device first embodiment 200. Hybrid electronic/photonic field programmable QPM device first embodiment comprises ferroelectric waveguide susceptible to light-assisted poling 205; waveguide bottom cladding 210; waveguide top cladding 215; (UV-transparent) first electrodes 220; UV illumination 225; second electrodes 230; and substrate/handle/other integrated devices 235. Wherein ferroelectric waveguide susceptible to light-assisted poling 205 is between waveguide bottom cladding 210 and waveguide top cladding 215. (UV-transparent) first electrodes 220 are proximate the surface of waveguide top cladding 215 opposite ferroelectric waveguide susceptible to light-assisted poling 205. UV illumination 225 is on the opposite side of (UV-transparent) first electrodes 220 from waveguide top cladding 215. Second electrodes 230 are proximate the surface of waveguide bottom cladding 210 opposite ferroelectric waveguide susceptible to light-assisted poling 205. Substrate/handle/other integrated devices 235 is proximate the surface of waveguide bottom cladding 210 opposite ferroelectric waveguide susceptible to light-assisted poling 205. Optional UV illumination 240 is on the opposite side of substrate/handle/other integrated devices 235 from waveguide bottom cladding 210. In embodiments, the ferroelectric waveguide susceptible to light-assisted poling 205 comprises a lithium niobate waveguide. Embodiments comprise either or both UV sources 225, 240. Generally in some embodiments without "upper" UV illumination source 225, (UV-transparent) first electrodes 220 are not UV transparent. In embodiments with a "lower" UV illumination source, substrate 235 is UV-transparent For embodiments, spacing of (UV-transparent) first electrodes 220, waveguide top cladding 215, ferroelectric waveguide 205, waveguide bottom cladding 210, and second electrodes 230 is determined to prevent one or more of optical scattering, waveguide mode leakage, mode alteration, and additional optical loss. Further regarding spacing and distances, where 50 microns is depicted (for example, for the thickness of ferroelectric waveguide 205, waveguide bottom cladding 210 and waveguide top cladding 215), the thickness can be in the range of about 1 to about 100 microns. In embodiments, the QPM region is between about 1 mm long to about 100 mm long. The QPM region size is approximately the same as the size of the electrodes' extent.

Figure 3:
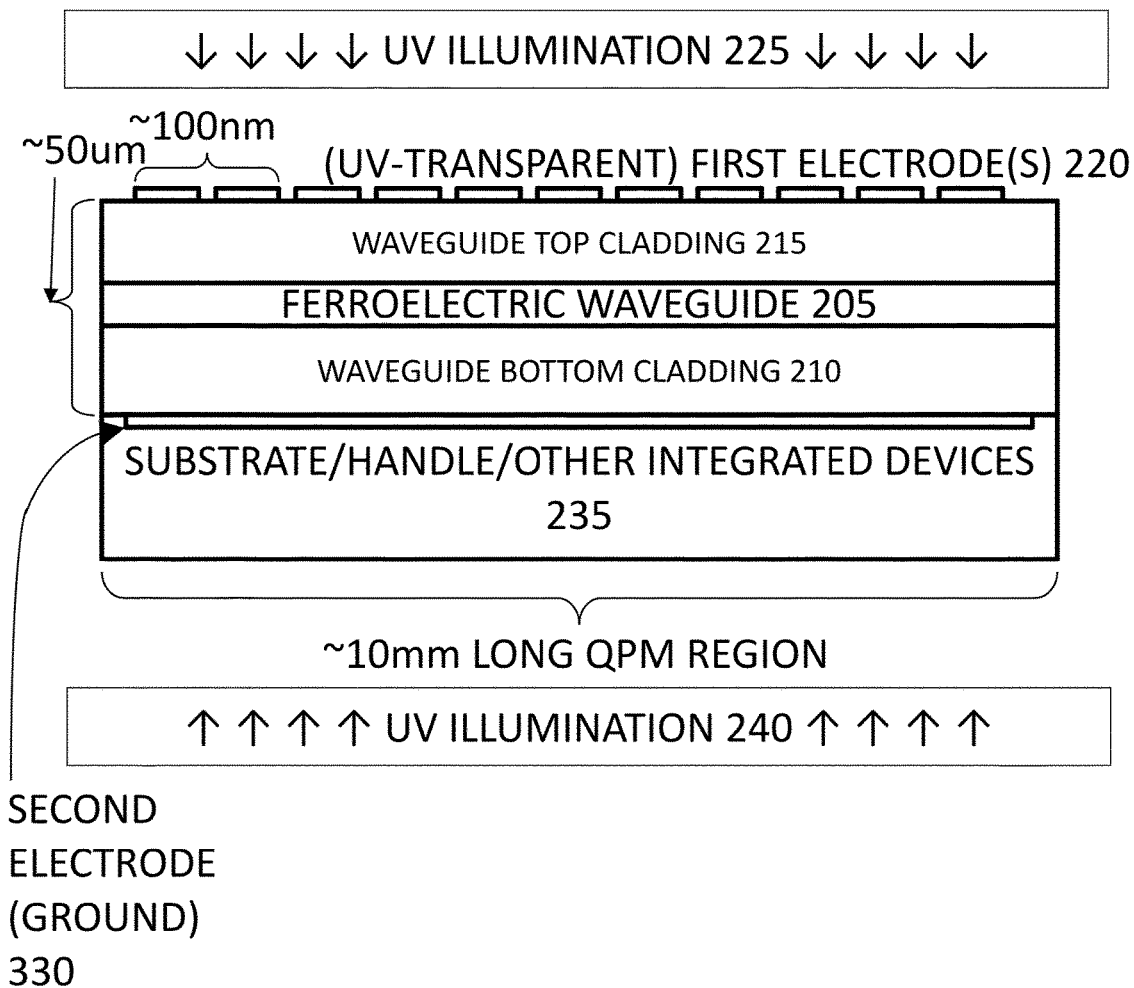
FIG. 3 is a hybrid electronic/photonic field programmable QPM device second embodiment configured in accordance with an embodiment.

FIG. 3 illustrates a QPM device second embodiment 300. Hybrid electronic/photonic field programmable QPM device second embodiment comprises ferroelectric waveguide susceptible to light-assisted poling 205; waveguide bottom cladding 210; waveguide top cladding 215; UV-transparent first electrodes 220; UV illumination 225; second (ground) electrode 330; and substrate/handle/other integrated devices 235. Wherein ferroelectric waveguide susceptible to light-assisted poling 205 is between waveguide bottom cladding 210 and waveguide top cladding 215. UV-transparent first electrodes 220 are proximate the surface of waveguide top cladding 215 opposite ferroelectric waveguide susceptible to light-assisted poling 205. UV illumination 225 is on the opposite side of UV-transparent first electrodes 220 from waveguide top cladding 215. Second (ground) electrode 330 is proximate the surface of waveguide bottom cladding 210 opposite ferroelectric waveguide susceptible to light-assisted poling 205. Substrate/handle/other integrated device 235 is proximate the surface of waveguide bottom cladding 210 opposite ferroelectric waveguide susceptible to light-assisted poling 205. Optional UV illumination 240 is on the opposite side of substrate/handle/other integrated devices 235 from waveguide bottom cladding 210. In embodiments, the ferroelectric waveguide susceptible to light-assisted poling 205 comprises a lithium niobate waveguide. Embodiments comprise either or both UV sources 225, 240. For embodiments, spacing of UV-transparent first electrodes 220, waveguide top cladding 215, ferroelectric waveguide 205, waveguide bottom cladding 210, and second (ground) electrode 330 is determined to prevent one or more of optical scattering, waveguide mode leakage, mode alteration, and additional optical loss.

Figure 4:
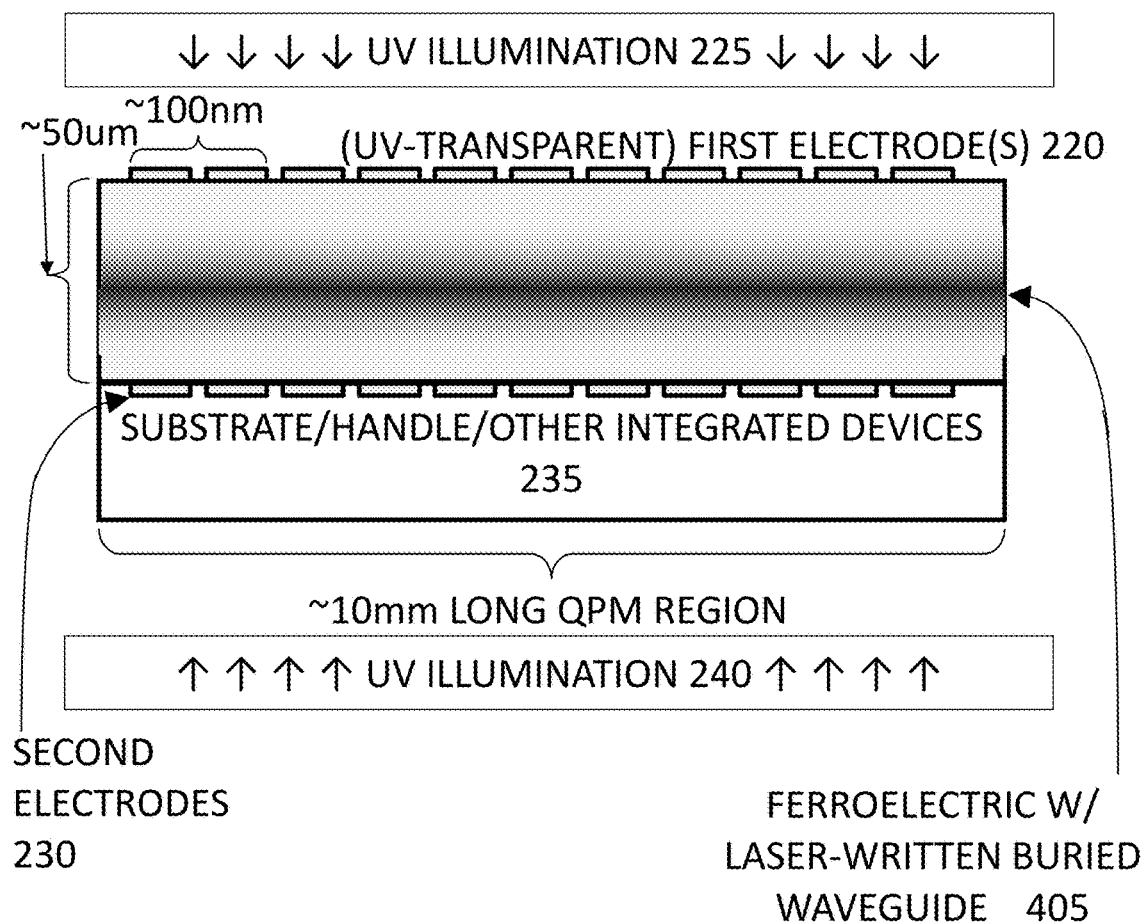
FIG. 4 is a hybrid electronic/photonic field programmable QPM device third embodiment configured in accordance with an embodiment.

FIG. 4 illustrates a QPM device third embodiment 400. Hybrid electronic/photonic field programmable QPM device third embodiment comprises ferroelectric waveguide susceptible to light-assisted poling w/ laser-written buried waveguide 405; UV-transparent first electrodes 220; UV illumination 225; second electrodes 230; and substrate/handle/other integrated devices 235. The ferroelectric waveguide susceptible to light-assisted poling w/ laser-written buried waveguide 405 is between UV-transparent first electrodes 220 and second electrodes 230. UV-transparent first electrodes 220 are proximate the surface of laser-written buried waveguide 405 opposite second electrodes 230. UV illumination 225 is on the side of UV-transparent first electrodes 220 opposite from ferroelectric waveguide susceptible to light-assisted poling w/ laser-written buried waveguide 405. Substrate/handle/other integrated devices 235 is proximate the surface of ferroelectric waveguide susceptible to light-assisted poling w/ laser-written buried waveguide 405 opposite UV-transparent first electrodes 220. Optional UV illumination 240 is on the opposite side of substrate/handle/other integrated devices 235 from second electrodes 230. In embodiments, the ferroelectric waveguide susceptible to light-assisted poling w/ laser-written buried waveguide 405 comprises a lithium niobate waveguide. Embodiments comprise either or both UV sources 225, 240. For embodiments, spacing of UV-transparent first electrodes 220, ferroelectric waveguide susceptible to light-assisted poling w/ laser-written buried waveguide 405, and second electrodes 230 is determined to prevent one or more of optical scattering, waveguide mode leakage, mode alteration, and additional optical loss.

Figure 5:
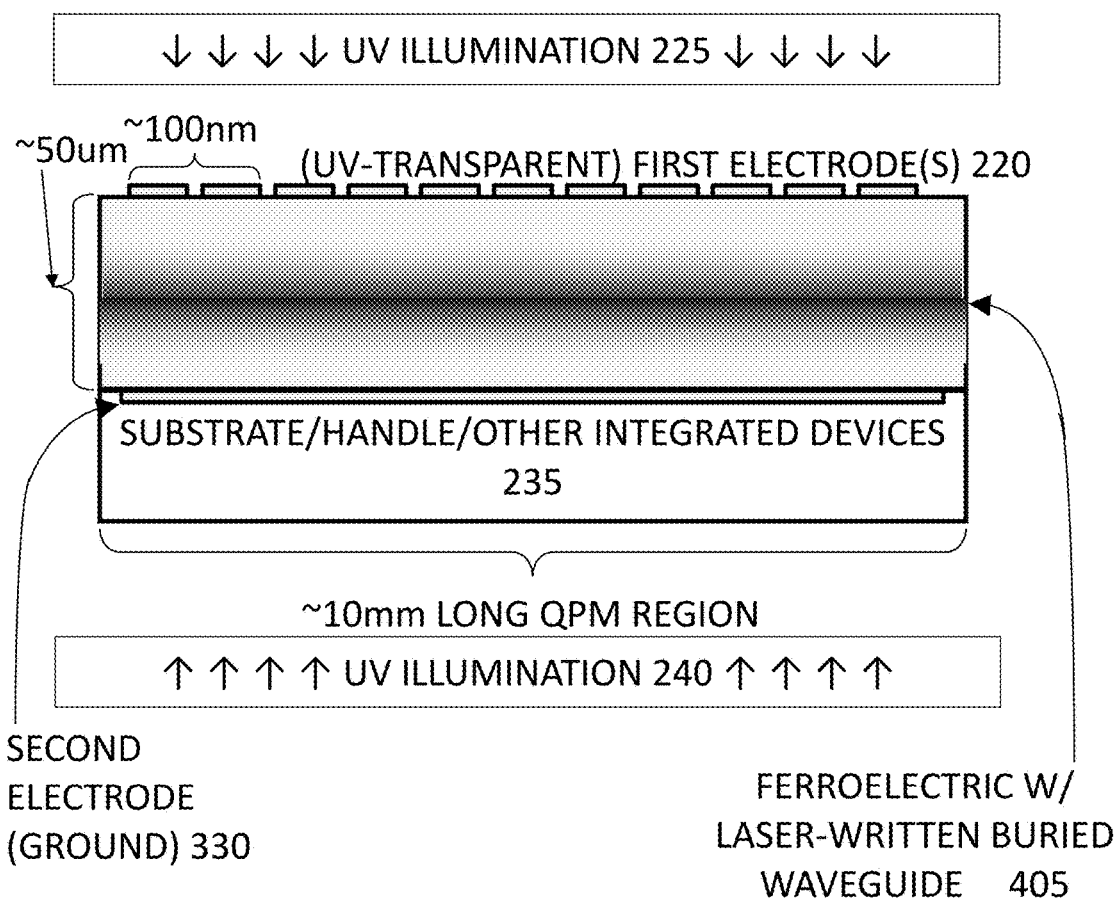
FIG. 5 is a hybrid electronic/photonic field programmable QPM device fourth embodiment configured in accordance with an embodiment.

FIG. 5 illustrates a QPM device fourth embodiment 500. Hybrid electronic/photonic field programmable QPM device fourth embodiment comprises ferroelectric waveguide susceptible to light-assisted poling w/ laser-written buried waveguide 405; UV-transparent first electrodes 220; UV illumination 225; second (ground) electrode 330; and substrate/handle/other integrated devices 235. The ferroelectric waveguide susceptible to light-assisted poling w/ laser-written buried waveguide 405 is between UV-transparent first electrodes 220 and second (ground) electrode 330. UV-transparent first electrodes 220 are proximate the surface of ferroelectric waveguide susceptible to light-assisted poling w/ laser-written buried waveguide 405 opposite second (ground) electrode 330. UV illumination 225 is on the side of UV-transparent first electrodes 220 opposite from ferroelectric waveguide susceptible to light-assisted poling w/ laser-written buried waveguide 405. Substrate/handle/other integrated devices 235 is proximate the surface of ferroelectric waveguide susceptible to light-assisted poling w/ laser-written buried waveguide 405 opposite UV-transparent first electrodes 220. Optional UV illumination 240 is on the opposite side of substrate/handle/other integrated devices 235 from second electrode 330. Embodiments comprise either or both UV sources 225, 240. For embodiments, spacing of UV-transparent first electrodes 220, ferroelectric waveguide susceptible to light-assisted poling w/ laser-written buried waveguide 405, and second electrode (ground) 330 is determined to prevent one or more of optical scattering, waveguide mode leakage, mode alteration, and additional optical loss.

Figure 6:
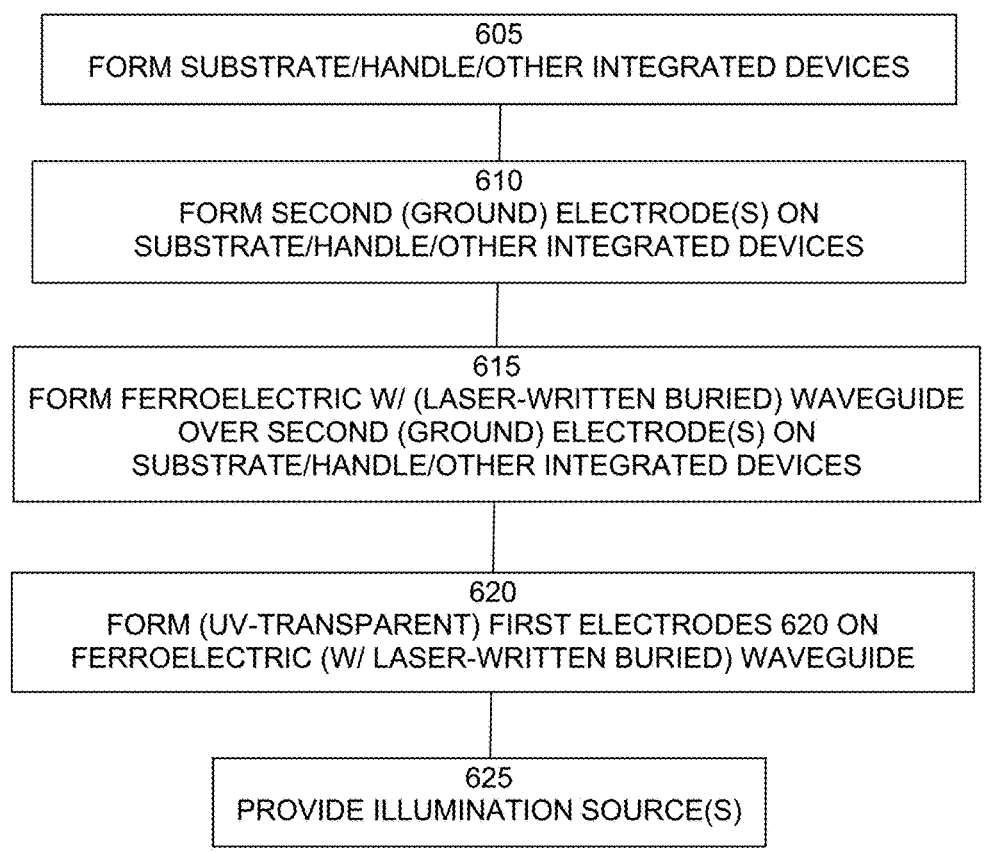
FIG. 6 is a flow chart depicting the steps of a method for fabricating a hybrid electronic/photonic field programmable array device configured in accordance with an embodiment.

FIG. 6 is a flow chart 600 depicting the steps of a method for fabricating a hybrid electronic/photonic field programmable QPM device. The steps comprise: forming substrate/handle/other integrated devices 605; forming second (ground) electrode(s) on substrate/handle/other integrated device(s) 610; forming ferroelectric waveguide susceptible to light-assisted poling (w/ laser-written buried) waveguide 615 over second (ground) electrode(s) on substrate/handle/other integrated device(s). Forming (UV-transparent) first electrodes 620 on ferroelectric waveguide susceptible to light-assisted poling (w/ laser-written buried) waveguide. Provide illumination source(s) 625. In embodiments, the step of forming ferroelectric waveguide susceptible to light-assisted poling 615 comprises a lithium niobate waveguide. In embodiments, fabrication comprises starting with wafers that are a thin film on LN on silicon or silicon dioxide. For embodiments, spacing of (UV-transparent) first electrodes 620, ferroelectric waveguide susceptible to light-assisted poling (w/ laser-written buried) waveguide 615, and second (ground) electrode(s) is determined to prevent one or more of optical scattering, waveguide mode leakage, mode alteration, and additional optical loss. In embodiments, the step of forming ferroelectric waveguide susceptible to light-assisted poling (w/ laser-written buried) waveguide 615 instead comprises forming a ferroelectric waveguide susceptible to light-assisted poling 205 with waveguide bottom cladding 210 and waveguide top cladding 215 as depicted in the structures of FIGS. 2 and 3. In some embodiments without an "upper" UV illumination source 625, formed (UV-transparent) first electrodes 620 are not UV transparent.

Figure 7:
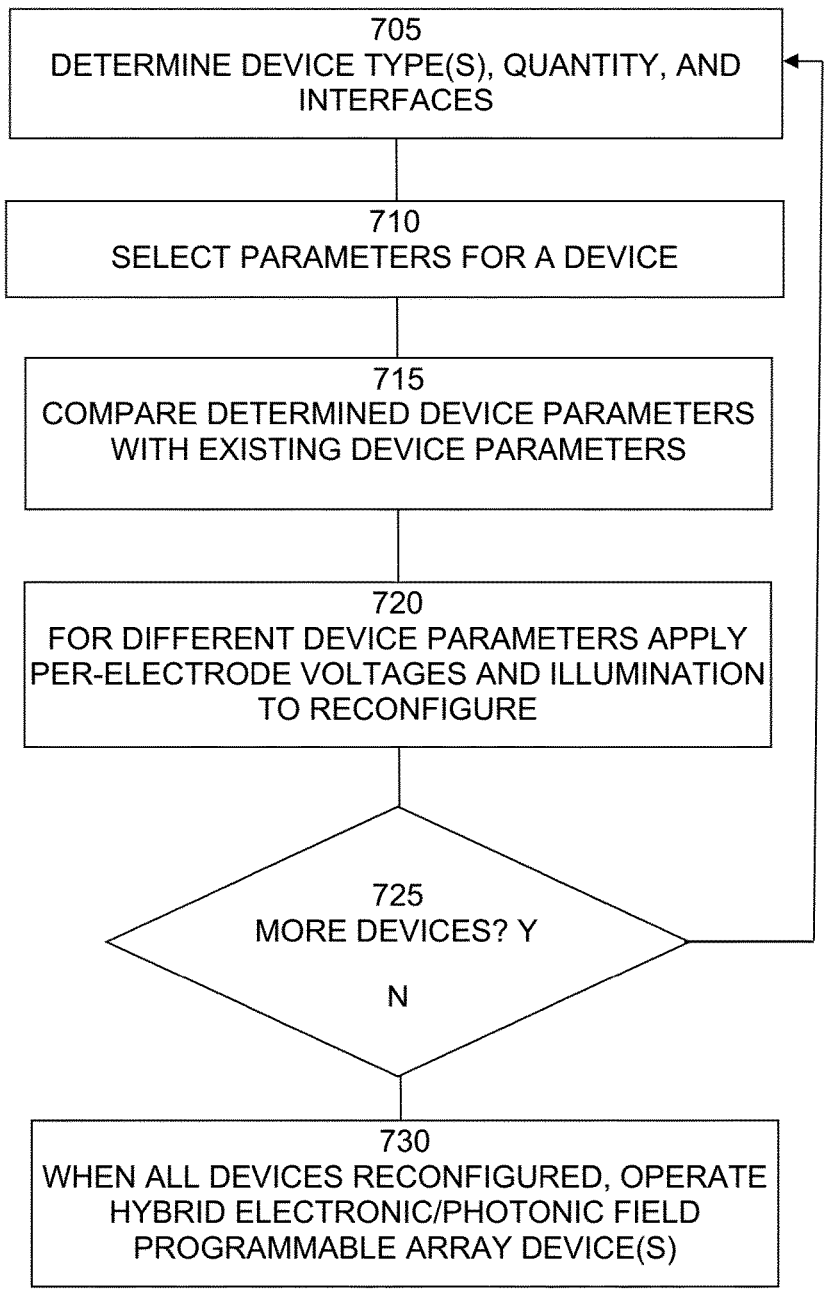
FIG. 7 is a flow chart depicting the steps of a method for using a hybrid electronic/photonic field programmable array device configured in accordance with an embodiment.

FIG. 7 is a flow chart 700 depicting the steps of a method for using a hybrid electronic/photonic field programmable QPM device array. The steps comprise: determining hybrid electronic/photonic QPM device type(s), quantity, and interfaces (705); selecting parameters for the electronic/photonic QPM device (710); comparing determined device parameters with existing device parameters (715); for different device parameters applying per-electrode voltages and illumination to reconfigure (720); determine if there are more devices (725); when all devices are reconfigured, operating hybrid electronic/photonic field programmable QPM array device(s) (730).

Figure 8:
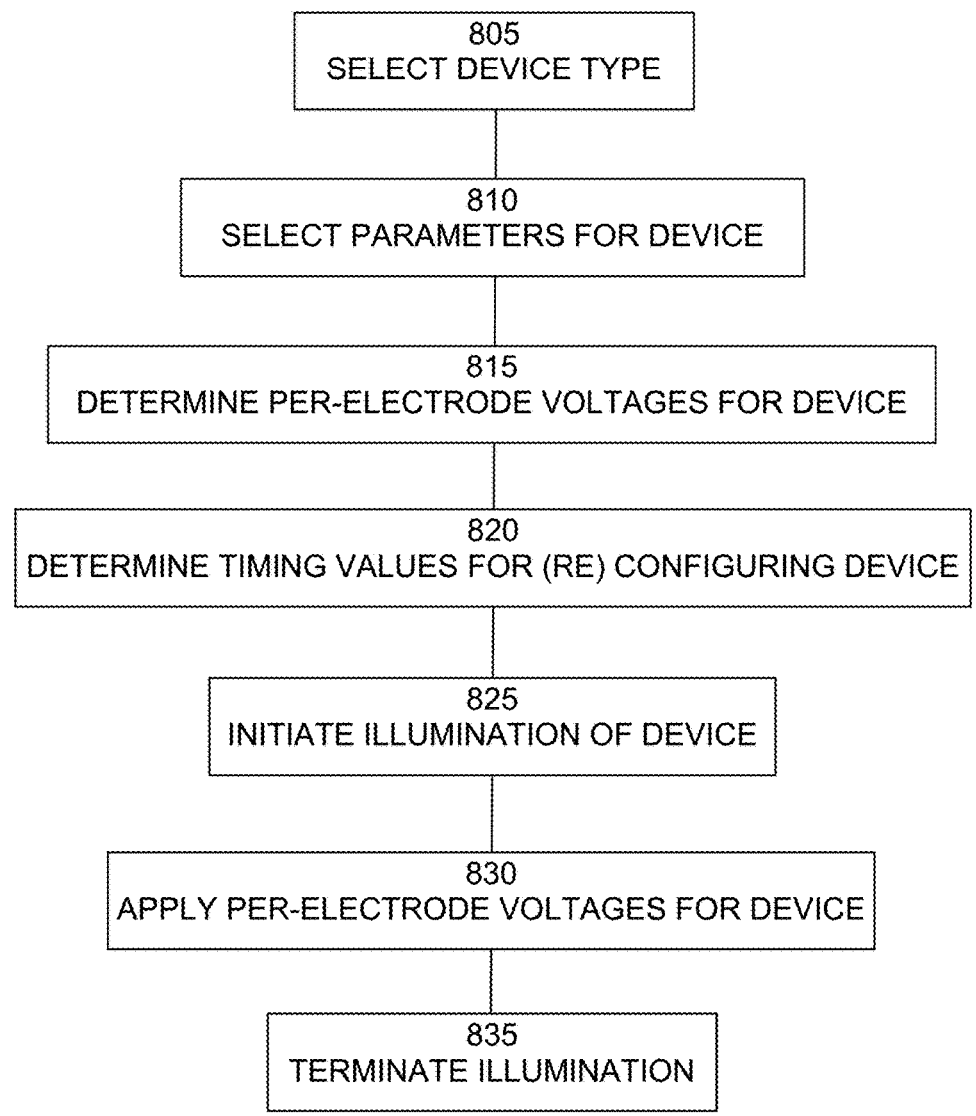
FIG. 8 is a flow chart depicting the steps of a method for (re)configuring a hybrid electronic/photonic field programmable array device configured in accordance with an embodiment.

FIG. 8 is a flowchart 800 depicting the steps of a method for (re)configuring a hybrid electronic/photonic field programmable QPM device of an array. The steps comprise: selecting QPM device type (805); selecting device parameters (810); determining per-electrode voltages (815); determining timing values (820); initiating illumination (825); applying per-electrode voltages (830); terminating per-electrode voltages according to timing values (835); terminating illumination according to timing values (840). In embodiments, the step of selecting device type (805) comprises selecting the desired nonlinear interaction: sum frequency generation, difference frequency generation, second harmonic generation, spontaneous parametric downconversion, optical rectification, etc. In embodiments, the step of selecting device parameters (810) comprises selecting the desired input and output wavelengths, operating temperatures, and phase matching bandwidths. In embodiments, the step of determining per-electrode voltages (815) comprises calculating the necessary voltage for domain inversion given the UV intensity and LN thickness, and setting the polarity of the voltage at each electrode (plus or minus) to match the desired orientation of each domain. In embodiments, the step of determining timing values (820) comprises calculating, simulating, or empirically determining the optimal duration of the voltage pulse. In embodiments, the step of initiating illumination (825) comprises turning on the UV light source(s). In embodiments, the step of applying per-electrode voltages (830) comprises applying the voltage pulse with amplitude, polarity, and duration determined in (815) and (820). In embodiments, the step of terminating illumination according to timing values (840) comprises turning off the UV light source(s).

Aspects of the present invention are described herein with reference to a flowchart illustration and/or block diagram of methods according to embodiments of the invention. It will be understood that blocks of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. An in situ reconfigurable hybrid quasi-phase matched (QPM) electronic/photonic field programmable device comprising:
   a ferroelectric waveguide susceptible to light-assisted poling;
   a plurality of ultra-violet (UV)-transparent first electrodes;
   at least one second electrode;
   at least one UV illumination source configured to illuminate at least one of said UV-transparent first electrodes and said at least one second electrode; and
   a substrate proximate said at least one second electrode;
   wherein said ferroelectric waveguide is between said UV-transparent first electrodes and said at least one second electrode.

2. The device of claim 1, wherein said ferroelectric waveguide comprises a laser-written buried waveguide.

3. The device of claim 1, wherein said ferroelectric waveguide comprises:
   a waveguide bottom cladding;
   a waveguide top cladding; and
   wherein a distance from said ferroelectric waveguide to said UV-transparent first electrodes and said at least one second electrode prevents one or more of optical scattering, waveguide mode leakage, mode alteration, and additional optical loss.

4. The device of claim 1 wherein said at least one second electrode comprises a single ground electrode.

5. The device of claim 3 wherein cladding layers comprise SiO2.

6. The device of claim 1 wherein said substrate comprises:
   at least one of a handle and other integrated devices.

7. The device of claim 1 wherein a thickness of said ferroelectric waveguide is about 50 microns;
   a spacing of said UV-transparent first electrodes is about 100 microns; and
   a QPM region is about 10 mm long wherein said QPM region is determined by spacing of said UV-transparent electrodes.

8. The device of claim 1 wherein said at least one UV illumination source comprises two UV illumination sources, a first proximate said first UV-transparent electrodes and a second UV illumination source proximate said at least one second electrode.

9. The device of claim 1 wherein said at least one UV illumination source comprises a first UV illumination source proximate said first UV-transparent electrodes, or a second UV illumination source proximate said at least one second electrode.

10. The device of claim 1, wherein said ferroelectric waveguide comprises magnesium oxide doped stoichiometric lithium niobate (MgO:SLN).

11. The device of claim 1 wherein said at least one second electrode comprises a plurality of electrodes.

12. An in situ reconfigurable hybrid electronic/photonic field programmable array system comprising:
    at least one UV illumination source;
    a plurality of in situ reconfigurable quasi-phase matched (QPM) hybrid electronic/photonic field programmable devices;
    wherein said plurality of in situ reconfigurable hybrid electronic/photonic field programmable devices comprising:
       a ferroelectric waveguide susceptible to light-assisted poling;
       UV-transparent first electrodes;
       at least one second electrode; and
       a substrate proximate the second electrodes;
       wherein said ferroelectric waveguide is between said UV-transparent first electrodes and said at least one second electrode.

13. The system of claim 12 wherein said devices of said array comprise at least one of:
    a second harmonic generation device;
    a sum or difference frequency generation device;
    a spontaneous parametric down-conversion device;
    an optical parametric amplification device:
    an optical parametric oscillator; and
    an optical rectification device.

14. The system of claim 12 wherein at least one of said plurality of in situ reconfigurable hybrid electronic/photonic field programmable devices comprising: reconfigurable QPM gratings comprises at least one of:
    chirped gratings, interlaced gratings, and sequential gratings.

15. The system of claim 12 wherein said ferroelectric waveguide comprises lithium tantalate.

16. The system of claim 12 wherein at least one of said plurality of in situ reconfigurable QPM hybrid electronic/photonic field programmable devices comprises:
    reconfigurable QPM gratings wherein said electrodes are patterned directly on top and bottom surfaces of a lithium niobate slab.

17. The system of claim 12 wherein at least one of said plurality of in situ reconfigurable QPM hybrid electronic/photonic field programmable devices comprises:
    electrode materials the same as those used in UV LEDs.

* * * * *